United States Patent [19]

Carsten

[11] Patent Number: 5,322,315
[45] Date of Patent: Jun. 21, 1994

[54] TOWING HITCH

[76] Inventor: Albert L. Carsten, P.O. Box 221, Durkee, Oreg. 97905

[21] Appl. No.: 2,244

[22] Filed: Jan. 8, 1993

[51] Int. Cl.$^5$ ................................................ B60D 1/36
[52] U.S. Cl. ........................... 280/479.2; 280/491.2; 280/491.3; 280/499
[58] Field of Search ............... 280/491.2, 491.1, 477, 280/499, 498, 506, 508, 478.1, 479.2, 474, 482, 484, 488, 491.3, 492

[56] References Cited

U.S. PATENT DOCUMENTS

| | | | |
|---|---|---|---|
| 2,582,595 | 1/1952 | Leveke | 280/478.1 |
| 2,745,680 | 5/1956 | Achenbach et al. | 280/478.1 |
| 2,973,971 | 3/1961 | Oddson | 280/479.3 |
| 3,126,210 | 3/1964 | Hill | 280/499 |
| 3,410,577 | 11/1968 | Luinstra | 280/479.2 |
| 4,073,508 | 2/1978 | George et al. | 280/491.3 |
| 4,603,878 | 8/1986 | Smith, Jr. | 280/479.2 |
| 4,944,525 | 7/1990 | Landry | 280/479.2 |
| 4,951,957 | 8/1990 | Gullickson | 280/479.3 |
| 4,976,453 | 12/1990 | Kaplan | 280/479.2 |

Primary Examiner—Mitchell J. Hill
Assistant Examiner—Anne Marie Boehler
Attorney, Agent, or Firm—Kolisch, Hartwell, Dickinson, McCormack & Heuser

[57] ABSTRACT

A towing hitch for coupling a towing vehicle with a vehicle which is to be towed is provided which includes a body having a pocket within which a receiver tube is pivotally mounted. The receiver tube telescopically mounts a tow bar which is configured for selected operative securement to a vehicle which is to be towed. The hitch is selectively locked in position using first and second pin assemblies, the first pin assembly including a first pin biased toward engagement with the body so as to selectively lock the receiver tube in place, and the second pin assembly including a second pin biased toward engagement with the tow bar so as to selectively lock the tow bar in place.

11 Claims, 3 Drawing Sheets

TOWING HITCH

TECHNICAL FIELD

The present invention relates generally to hitches, and more particularly, to a wide range towing hitch of the type used in coupling a towing vehicle with a vehicle which is to be towed. The hitch is suitable for use in coupling vehicles of virtually any size, but has proven particularly beneficial in the coupling of large vehicles where precise relative positioning of the vehicles is difficult to achieve.

BACKGROUND ART

Conventional towing hitches are relatively simple devices, often consisting of little more than a rigid framework with coupling structure such as a hitch ball fixed rigidly thereto. The hitch is usually semi-permanently secured to the rear of a towing vehicle and a trailing vehicle is removably attached to the hitch. Generally, the trailing vehicle is attached to the hitch by pivotal joinder of the hitch's coupling structure with corresponding structure on the trailing vehicle. A connection is thus provided by which the trailing vehicle may be towed.

Although such conventional hitch arrangements have proven effective once the towing and trailing vehicles are coupled, most known arrangements present difficulties related to the manner in which such coupling is achieved. Coupling of the towing and trailing vehicles, for example, generally requires precise alignment between the hitch's coupling structure and the corresponding structure of the trailing vehicle, a task which is made increasingly difficult as the size and weight of the vehicles increase. It is therefore an object of this invention to provide an improved towing hitch which accommodates coupling of the towing vehicle with the vehicle which is to be towed.

One way of dealing with alignment problems in the coupling of vehicles has been to provide a hitch with coupling structure which is movable relative to both the towing vehicle and the vehicle which is to be towed. Such hitches, known as wide-range towing hitches, accommodate coupling of the towing and trailing vehicles without requiring precise relative positioning of the vehicles involved. In a wide-range towing hitch, the coupling structure is moved so as to place it in alignment with corresponding structure on the trailing vehicle, requiring only that the vehicles be placed in close proximity to one another. Upon achieving such proximity, the coupling structure is attached to corresponding structure on the trailing vehicle and the trailing vehicle is towed.

Although known wide-range towing hitches have solved various problems related to achieving the initial connection between towing and trailing vehicles, they have presented various other undesirable characteristics. Known hitches, for example, have included complicated alignment mechanism, increasing manufacturing costs and increasing the price paid by the consumer. Such hitches have also been characterized by unwanted "slop" in the hitch, often leading to an unstable coupling joint and to problems such as trailing vehicle surge. Wide-range towing hitches have also exhibited unnecessarily restricted coupling structure movement, a characteristic which is contrary to the hitch's wide-ranging intent. It is therefore an object of this invention to provide an improved, cost-effective, wide-range towing hitch which does not unduly restrict movement of the coupling structure.

DISCLOSURE OF THE INVENTION

The invented towing hitch addresses the above-identified problems, such hitch employing alignment mechanism which allows for stable coupling of a towing and trailing vehicles without introducing unnecessary complexity to the hitch's design. Toward this end, the hitch includes a body which is suited for operative securement to a towing vehicle, the body defining a pocket with an elongate opening for providing access thereto. A receiver tube is pivotally mounted within the pocket, such receiver tube being sized for telescoping receipt of a tow bar therein. The tow bar is mounted for movement within the receiver tube, extending through the base's opening for selected operative securement to the vehicle which is to be towed.

The hitch is selectively locked in a towing orientation via first and second pin assemblies, the assemblies being mounted on the hitch's receiver tube for use in locking both the receiver tube and tow bar in place. The first pin assembly includes a corresponding first movable pin, the pin being biased toward engagement with the hitch body so as to lock the tube in place upon pivoting of the same into a predefined tube orientation. When the tube is in such predefined orientation, the first pin will be received by a recess in the body so as to prevent pivoting of the tube. The second pin assembly includes a corresponding second movable pin which is biased toward engagement with the tow bar so as to lock the tow bar in place upon extension of the same into a predefined bar orientation. The tow bar is locked by extension of the second pin into a recess in the bar, preventing extension of the bar from within the receiver tube.

DETAILED DESCRIPTION OF THE PREFERRED EMBODIMENT AND BEST MODE FOR CARRYING OUT THE INVENTION

As stated above, the present invention relates to an improved wide-range towing hitch for use in the coupling of a towing vehicle with vehicle which is to be towed. The hitch is suited for broad use, but has demonstrated particular utility in the coupling of large vehicles such as RVs and trucks. Consequently, the following disclosure describes the invention in the context of a truck which is fitted with the invented towing hitch so as to accommodate the towing of an RV or the like.

Figure 1:
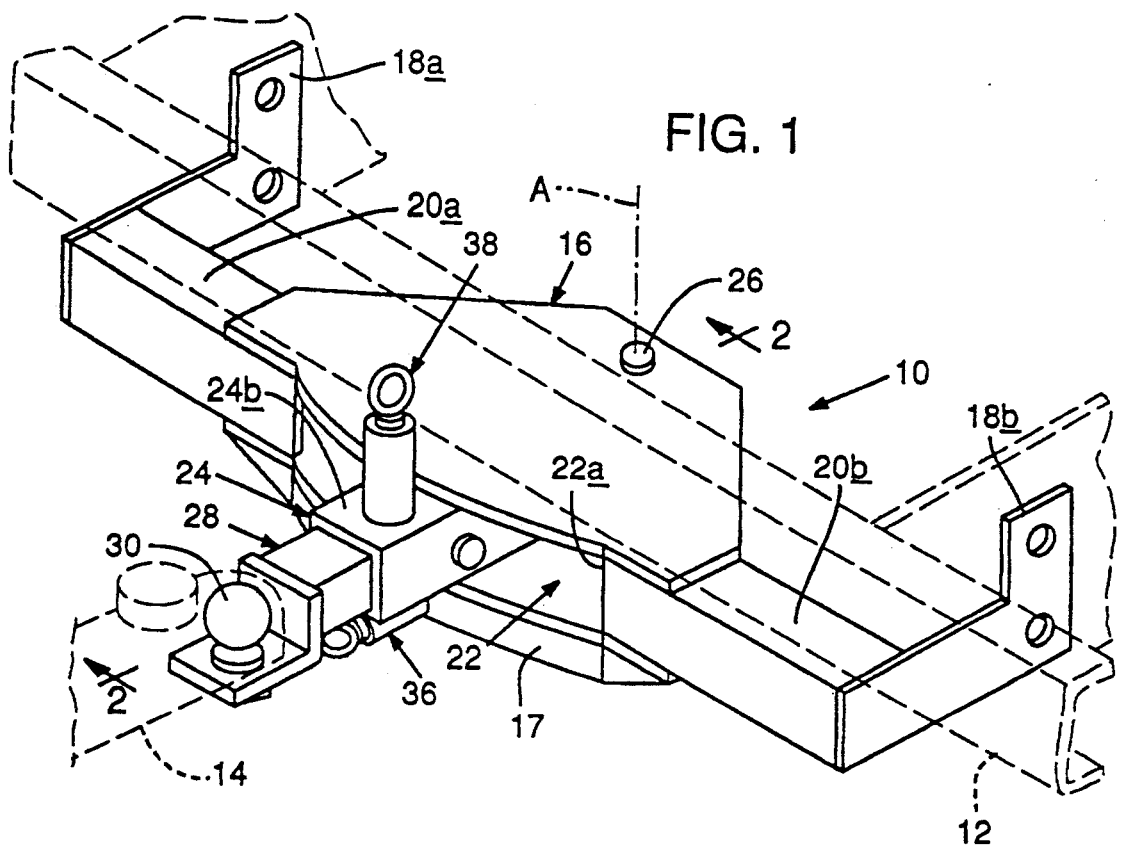
FIG. 1 is an isometric view illustrating a preferred embodiment of the invented towing hitch with the hitch's receiver tube and tow bar locked in place.
Figure 3:
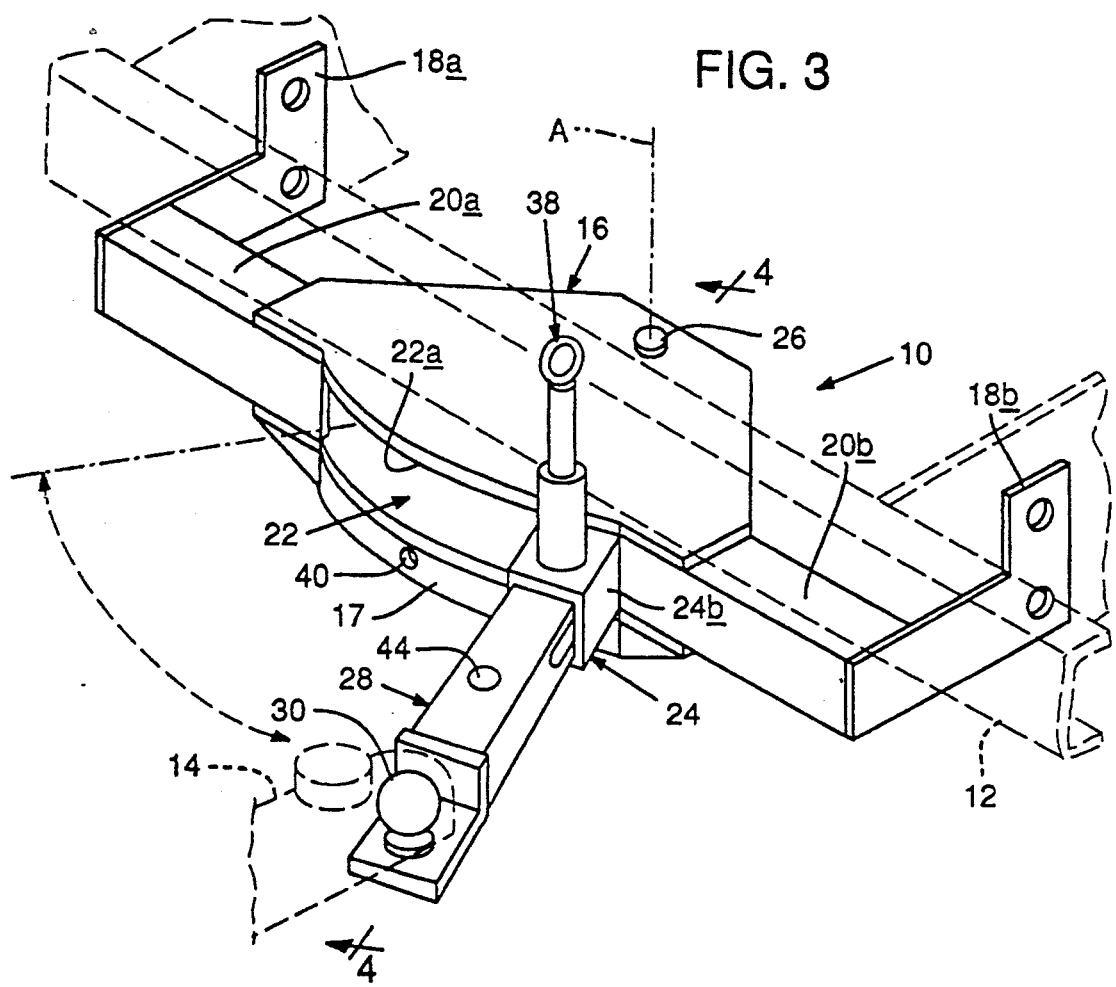
FIG. 3 is an isometric view of the invented towing hitch with the hitch's receiver tube pivoted and tow bar extended.

Turning now to the drawings, and with particular reference to FIGS. 1 and 3, the reader will note that a preferred embodiment of the invented towing hitch has been depicted in different phases of its operation, the hitch being indicated generally at 10. As shown, the hitch is configured for securement to the rear of a towing vehicle such as truck 12, the truck being indicated only generally by dashed lines in the drawing figures which form a part of this disclosure. In keeping with one of the principal objects of the invention, the hitch is also configured for securement to a trailing vehicle such as the RV which is shown generally by dashed lines at 14. Hitch 10 will thus be seen to accommodate coupling of the depicted towing and trailing vehicles so that the trailing vehicle may be towed.

Referring still to FIGS. 1 and 3, and focusing more specifically on the securement of the hitch to the towing vehicle, attention is drawn to the fact that the invented towing hitch 10 includes a hitch body 16. In the depicted embodiment, body 16 is suited for operative securement to the towing vehicle via a pair of rigid brackets 18a, 18b, each such bracket being mounted on the hitch body by a corresponding transverse member 20a, 20b. The transverse members, it will be understood, are of a length to accommodate positioning of the brackets so that they may be rigidly secured to the underbody of the towing vehicle in a manner similar to that generally shown. The hitch preferably is secured near the rear of the vehicle with at least a portion of the hitch extending out from beneath the vehicle so that the trailing vehicle may be readily removably secured thereto. Those skilled in the art, however, will appreciate that various alternative hitch securement arrangements may be employed without departing from the invention as claimed.

Figure 2:
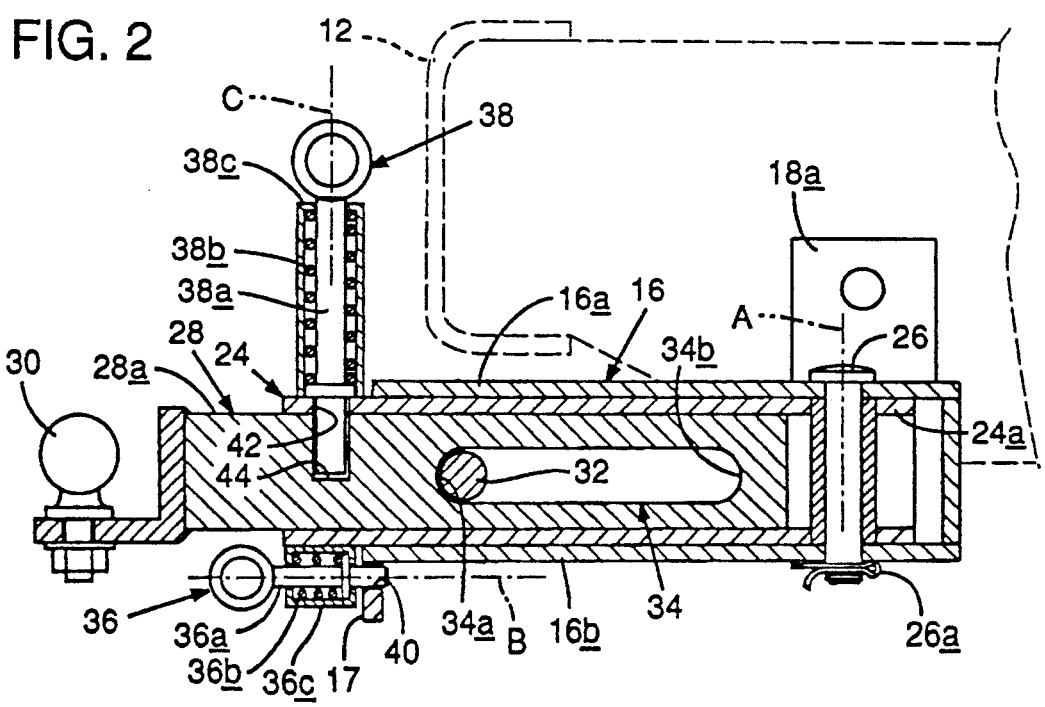
FIG. 2 is a sectional view of the hitch shown in FIG. 1, the view being taken generally along line 2—2 thereof.
Figure 4:
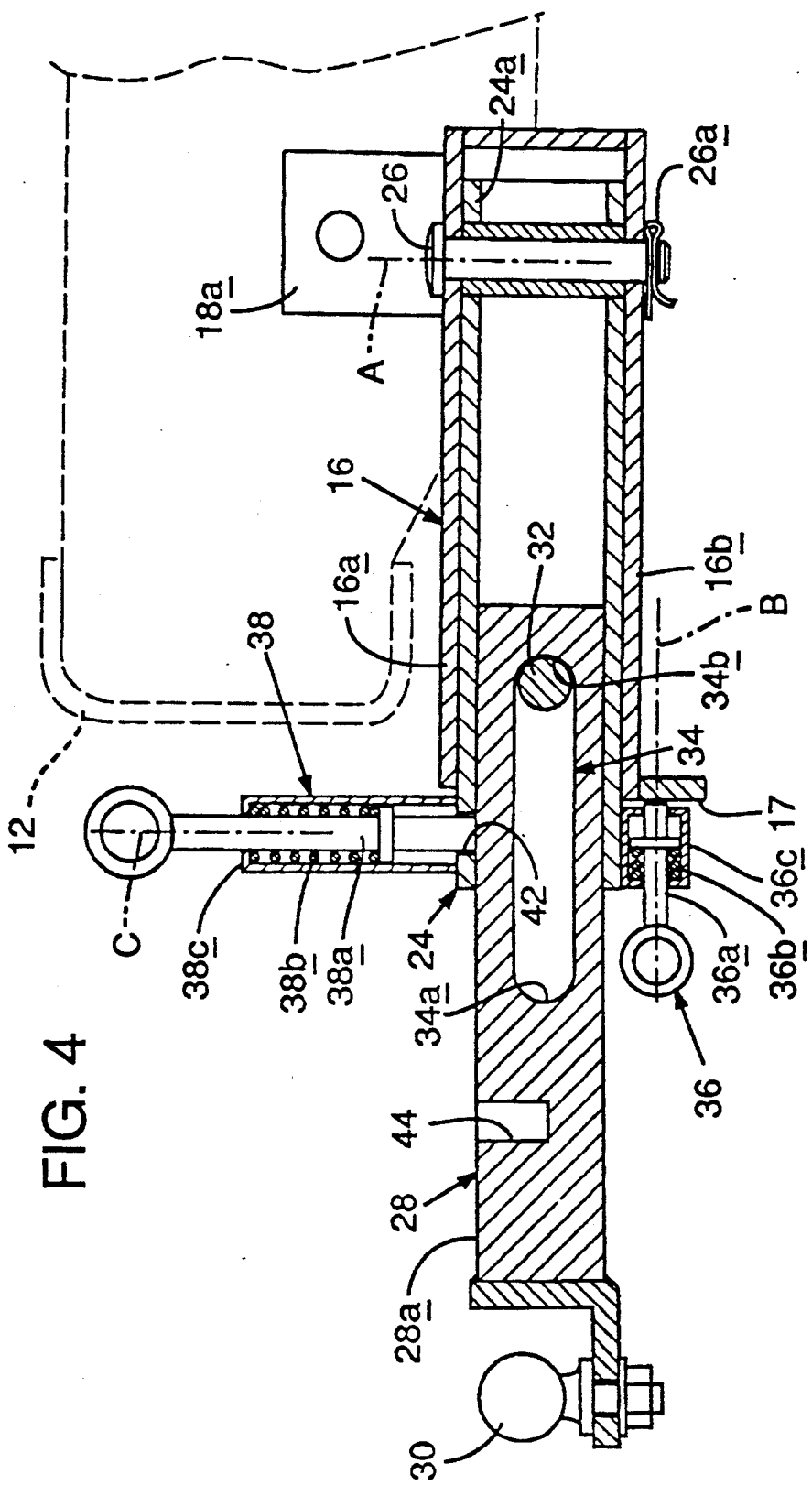
FIG. 4 is a sectional view of the hitch shown in FIG. 3, the view being taken generally along line 4—4 thereof.

Bringing FIGS. 2 and 4 into the discussion, and referring to body 16 in greater detail, it will be noted that such body includes a pair of generally trapezoidal plates 16a, 16b. The plates are spaced and are generally parallel to one another, the space between the plates being maintained by the hitch's transverse members. As shown, the body is hollow, defining a pocket 22 therein. An elongate opening 22a extends along at least one side of the body, providing access thereto. Upon reading further, it will apparent that pocket 22 may include similar openings on any or all other sides. Proper hitch operation, however, requires that the aforementioned spaced parallelism between the plates be maintained.

As indicated, towing hitch 10 further includes an elongate receiver tube 24. Such receiver tube is mounted within the body's pocket, the tube being pivotal so as to accommodate side-to-side positioning of the hitch's coupling structure as will be explained below. Preferably, the tube is operatively pivotally connected to the body adjacent the tube's forward end 24a. The tube is secured to the hitch body via a pivot shaft 26 which extends through the receiver tube adjacent the tube's forward end. In the depicted embodiment, the pivot shaft is held in place by a cotter pin 26a, the shaft thus being selectively removable upon removal of the cotter pin. As will be apparent upon a review of the drawing figures, the tube pivots about an axis A, such axis being defined by shaft 26 and passing generally normally through both plates 16a and 16b.

Referring once again to FIGS. 1 and 3, the reader will see that the receiver tube's rearward end 24b extends through opening 22a, the tube thus being suitable for external mounting of locking structure in a manner to be described below. By such extension, it will be noted that the rearward end of the receiver tube will engage one or the other of the transverse members upon a predetermined pivotal displacement, the tube's pivot being limited according to the length of opening 22a. In the depicted embodiment, the tube pivots through an angle of approximately 60 degrees as shown generally by dashed-line arrow in FIG. 3. It will therefore be understood that the transverse members act as stops to continued pivotal movement, guarding against damage to the hitch or to the vehicles which is caused by the receiver tube passing beneath the towing vehicle.

Mounted for movement within receiver tube 24 is an elongate tow bar 28, the tow bar having an exterior shape which corresponds to the interior shape of the receiver tube so that the bar may be received within the tube. As will be appreciated upon a comparison of FIGS. 1 and 2 to FIGS. 3 and 4, the tow bar is mounted to allow telescopic extension and retraction thereof relative to the receiver tube so as to accommodate vehicle coupling. The tow bar is fitted adjacent its rearwardly-extending end with coupling structure such as hitch ball 30, such structure being capable of selected operative securement to the vehicle which is to be towed. Preferably, the coupling structure allows pivoting of the trailing vehicle relative to the hitch so as to allow ready towing of the trailing vehicle. The coupling structure also preferably releasably captures corresponding structure on the trailing vehicle so that various trailing vehicles may be towed by the same hitch. Those skilled in the art, however, will understand that the coupling structure may be of virtually any known type including mechanism such as pinned fingers or the like.

Referring now with specificity to FIGS. 2 and 4, it will be noted that the hitch includes a keeper 32 which is set within an elongate slot 34 in the tow bar. The keeper is secured to the receiver tube, the tube defining a reference relative to which tow bar extension and retraction is measured. As should be apparent upon reference to the drawings, the keeper acts to limit telescoping movement of the tow bar by engagement of the keeper with opposite terminal ends 34a, 34b of the slot. More specifically, the keeper engages a first terminal end 34a of the slot when the tow bar is in a fully-retracted position (see FIGS. 1 and 2), and the keeper engages a second terminal end 34b of the slot when the tow bar is in a fully-extended position (see FIGS. 3 and 4).

Focusing still on FIGS. 2 and 4, but as also shown generally in FIGS. 1 and 3, it will noted that hitch 10 includes first and second pin assemblies 36, 38, respectively. The pin assemblies are both mounted on the hitch's receiver tube, each operating to restrict adjustment of the hitch in a different degree of freedom. Toward this end, first pin assembly 36 is configured to lock the receiver tube in place upon pivoting of the same into a predefined tube orientation and second pin assembly 38 is configured to lock the tow bar in place upon movement of the tow bar into a predefined bar orientation. Both the tube and the bar are shown in these predefined orientations in FIGS. 1 and 2. The receiver tube, however, may be pivoted and the tow bar extended as shown in FIGS. 3 and 4.

First pin assembly 36, it will be appreciated, operates selectively to lock the receiver tube in a generally central orientation using a first movable pin 36a. Pin 36a is mounted for movement along an axis B which runs generally parallel to the tow bar. As shown, the pin is biased toward engagement with a face 17, such face acting as a glide surface along which the first pin will pass during pivoting of the receiver tube. The first pin is biased via a coil spring 36b, the spring preferably being mounted in a housing 36c as shown. As best illustrated in FIGS. 2 and 3, face 17 defines a body recess 40 along its length, the recess accommodating receipt of the first pin when the tube is placed in the above-described central orientation. Although the depicted body recess passes through face 17, those skilled in the art will appreciate that the recess need only be configured to capture of the pin. Preferably, pivoting of the tube results in travel of the first pin along face 17 until the pin passes over the body recess and is automatically captured thereby.

The second pin assembly 38 operates selectively to lock the tow bar in a fully-retracted orientation, such assembly employing a second movable pin 38a. The second pin is mounted for movement along an axis C which runs generally normal to the tow bar in the embodiment shown. The second pin passes through a hole 42 and is biased toward engagement with a surface 28a on tow bar 28. Such biased engagement is achieved via a coil spring 38b, the spring preferably being mounted in a housing 38c as shown. During extension or retraction of the tow bar, pin 38a travels along surface 28a, the surface acting as a glide surface so as to selectively, readily allow tow bar movement. In order to accommodate locking of the tow bar in place, surface 28a defines a tow bar recess 44, such recess being configured to receive the second pin when the tow bar is placed in the above-described fully-retracted orientation. When the bar is moved to such an orientation, the second pin is automatically captured by the tow bar recess, locking the tow bar in place.

Upon coupling the towing vehicle with the vehicle which is to be towed, the towing vehicle driver simply gets into the towing vehicle, backs up until the second pin seats within tow bar recess, and then pulls forward so as to pivot the tube until the first pin seats within the body recess. The tube is subsequently freed by pulling the first pin until it clears the body recess. Once freed, the tube may be pivoted with the pin once again engaging face 17 for sliding travel therealong. Similarly, the tow bar is unlocked by pulling the second pin so as to free it from capture by the tow bar recess. The tow bar may then be moved and the second pin released so as to engage surface 28a for sliding travel therealong.

While the present invention has been shown and described with reference to the foregoing operational principles and preferred embodiment, it will be apparent to those skilled in the art that other changes in form and detail may be made without departing from the spirit and scope of the invention as defined by the appended claims.

I claim:

1. A hitch for use in coupling a towing vehicle with a vehicle which is to be towed, the hitch comprising:
   a hitch body suited for operative securement to the towing vehicle, said body defining a pocket with an elongate opening which provides access thereto;
   an elongate receiver tube having forward and rearward ends, said forward end being operatively pivotally connected to said body from within said pocket and said rearward end extending from within said pocket through said opening;
   an elongate tow bar mounted for movement within said receiver tube, said tow bar being configured for selected operative securement to the vehicle which is to be towed;
   a first pin assembly mounted on said receiver tube, said first assembly including a first movable pin which is biased toward engagement with said body so as to lock said receiver tube in place without restricting movement of said tow bar upon pivoting of said receiver tube into a predefined tube orientation; and
   a second pin assembly mounted on said receiver tube, said second assembly including a second movable pin which is biased toward engagement with said tow bar so as to lock said tow bar in place without restricting pivot of said receiver tube upon movement of said tow bar into a predefined bar orientation.

2. The hitch of claim 1, wherein said body defines a body recess positioned to accommodate receipt of said first pin when said tube is in said predefined tube orientation.

3. The hitch of claim 2, wherein said tow bar defines a tow bar recess positioned to accommodate receipt of said second pin when said tow bar is in said predefined bar orientation.

4. The hitch of claim 1, wherein said body includes an elongate glide surface with a body recess defined therein, said first pin being biased toward engagement with the body's glide surface for selected travel therealong, said body recess being configured for capture of said first pin upon passage of said first pin thereover.

5. The hitch of claim 4, wherein said tow bar includes a elongate glide surface with a tow bar recess defined therein, said second pin being biased toward engagement with the tow bar's glide surface for selected travel therealong, said tow bar recess being configured for capture of said second pin upon passage of said second pin thereover.

6. The hitch of claim 1, wherein said first pin is biased toward engagement with said body via a spring.

7. The hitch of claim 6, wherein said second pin is biased toward engagement with said tow bar via a spring.

8. The hitch of claim 1 further comprising a keeper mounted on said receiver tube, said keeper selectively operating on said tow bar to limit movement thereof.

9. The hitch of claim 8, wherein said tow bar defines an elongate slot, said keeper being set within said slot to limit movement of said tow bar.

10. The hitch of claim 9, wherein said tow bar is movable between a fully-retracted position wherein said keeper engages a first terminal end of said slot and a fully-extended position wherein said keeper engages a second terminal end of said slot.

11. A hitch for use in coupling a towing vehicle with a vehicle which is to be towed, the hitch comprising:
   a hitch body suited for operative securement to the towing vehicle, said body having a pocket with an elongate opening and an elongate glide surface with a body recess defined therein;
   an elongate receiver tube having forward and rearward ends, said forward end being operatively pivotally connected to said body from within said pocket and said rearward end extending from within said pocket through said opening;
   an elongate tow bar mounted for movement within said receiver tube, said tow bar being configured for selected operative securement to the vehicle which is to be towed and defining a tow bar recess therein;
   a first pin assembly mounted on said receiver tube, said first assembly including a first pin biased for movement along said receiver tube toward engagement with said glide surface, said first pin being effective to lock said receiver tube in place without restricting movement of said tow bar upon pivoting of said receiver tube to an orientation wherein said first pin is aligned with said body recess; and a second pin assembly mounted on said receiver tube, said second assembly including a second pin which is biased for movement toward engagement with said tow bar, said second pin being effective to lock said tow bar in place upon movement of said tow bar to an orientation wherein said second pin is aligned with said tow bar recess.

* * * * *